Sept. 9, 1969
H. E. SEXTON
3,465,850
AIR BOOSTER FOR CLAM-TYPE DRUM BRAKE
Filed Sept. 1, 1967
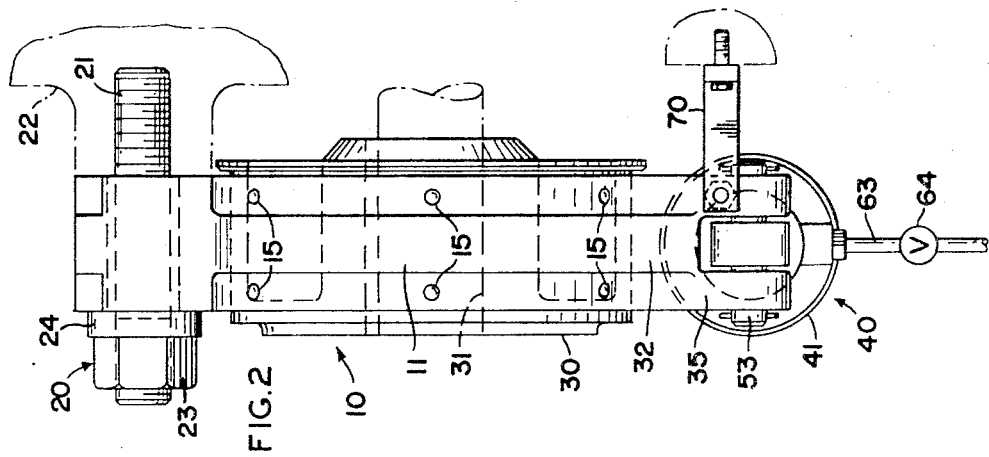
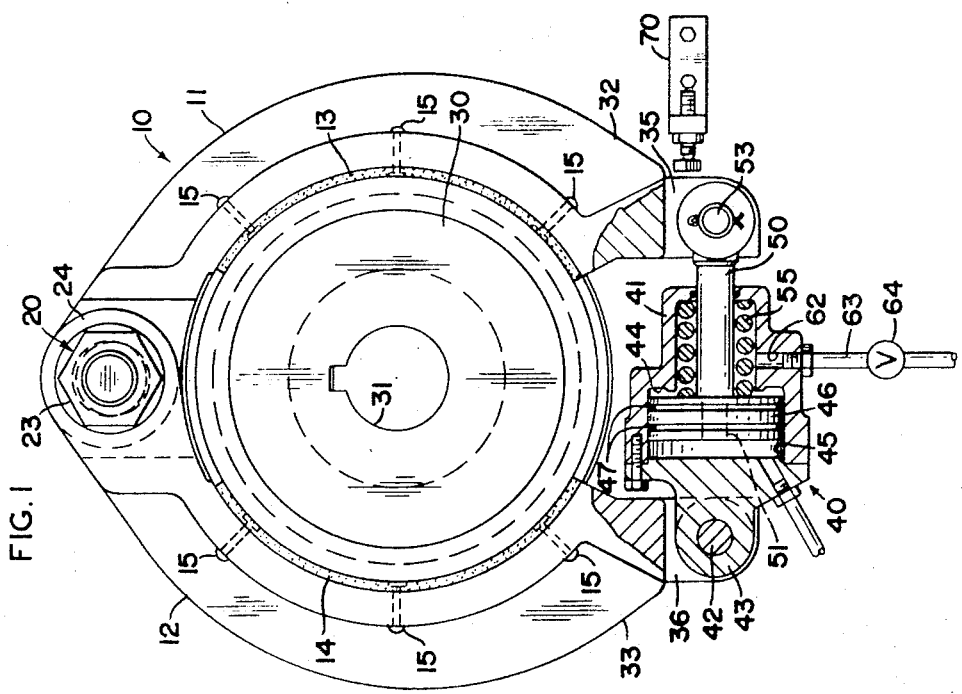
INVENTOR.
HARVEY E. SEXTON
BY
Meyer, Tilberry & Body
ATTORNEYS.

United States Patent Office 3,465,850
Patented Sept. 9, 1969

3,465,850
AIR BOOSTER FOR CLAM-TYPE DRUM BRAKE
Harvey E. Sexton, Hastings, Mich., assignor to E. W.
Bliss Company, Canton, Ohio, a corporation of
Delaware
Filed Sept. 1, 1967, Ser. No. 665,149
Int. Cl. F16d 51/22, 51/24, 63/72
U.S. Cl. 188—75                                  5 Claims

ABSTRACT OF THE DISCLOSURE

A clam-type drum brake having an actuator with a double acting fluid cylinder spring loaded and subject to air pressure on the torque side and a constant air pressure on the releasing side. A variable valve is used to control the air pressure on the torque side of the cylinder which constitutes the major applied force for obtaining the required torque and also provides an adjustment means to compensate for brake lining wear.

---

This invention relates to an improved clam-type drum brake and more particularly to an improved actuator for such a brake.

Clam-type drum brakes have been used for many years. Brakes of this type normally employ a spring-loaded hydraulic cylinder as the actuating means with the spring constituting the major applied force for obtaining the desired torque. Fluid pressure, usually air, is used to overcome the bias of the spring and effect release of the brake. The presence of the spring provides a safety feature in that the brake will automatically be actuated in the event of air failure thereby providing emergency stopping of the machine in which the brake is being used.

The use of a spring-loaded actuator does have some drawbacks. Thus, as is normal with all brake constructions, the use of a brake over a period of time results in wear of the brake linings. Since the frictional engagement of the linings in the brake is determined by the extent to which the spring is under compression, it will be appreciated that as the linings wear, the compression on the spring is relieved and if the spring is not adjusted periodically, the brake ultimately will fail to function. To compensate for lining wear and maintain the proper degree of compression on the spring, the prior art has provided various types of manual, as well as automatic, adjustment mechanisms. The usual automatic wear compensators developed heretofore have not achieved any substantial degree of commercial success when applied to clam type brakes primarily because of their complexity and resultant high cost.

By far the most common means of adjusting a clam type brake for lining wear continues to be by manual means such as a threaded connection between the piston rod and the end of one of the brake shoes. With this arrangement, it is necessary that the operation of the brake be discontinued while the threaded connection is being adjusted. Moreover, with this approach, it is difficult to determine accurately the amount of adjustment necessary to compensate for the wear of the brake linings and normally a trial and error approach is employed. This requires periodic stopping and starting of the mechanism while the brake is adjusted until a satisfactory adjustment has been obtained.

Another problem in employing a spring as the means for actuating the brake is that of varying the frictional grip of the brake shoes on the drum to obtain a particular desired torque level. Thus, to set the brake at a predetermined torque level, it is necessary to adjust the amount of compression on the spring in the same manner as when adjusting the brake to compensate for lining wear. Here again, it is an imprecise method of setting the brake and only by trial and error can it be assured that the precise desired torque level has been obtained. Moreover, in the event that it is desired to vary the torque of the brake, it is again necessary to discontinue operation of the brake and manually reset the compression on the spring. Of course, as the linings of the brake are worn, the compression on the spring is relieved and the torque obtained from the brake decreases from the level at which it was initially set. This again requires an adjustment of the spring compression.

It is the primary object of this inventon to provide a clam-type drum brake in which the brake may be adjusted while in operation to compensate for lining wear and to vary the torque desired.

It is another important object of this invention to provide a booster brake which is quicker acting than prior brakes and which may be used for sudden stopping of a moving part in the event of a malfunction.

It is another object of this invention to provide a clam-type drum brake in which the brake is spring loaded into engagement in the event of air failure but which employs air pressure as the major applied force during normal brake operation.

Another object of the invention is to provide a simple and inexpensive means for compensating for brake lining wear while the brake is in operation.

Still another object of the invention is to provide an improved clam-type drum brake in which the conventional brake actuator may be readily modified to provide improved performance for the brake.

These objects, as well as others which will be apparent to those having ordinary skill in the art, are achieved in a clam-type drum brake of the type having a rotatable drum with first and second brake shoes or straps disposed on opposite sides of the drum. Pin means pivotally interconnect the shoes at one end whereby the shoes are supported for pivotal movement radially toward and away from the drum. An actuator interconnects the other ends of the shoes with the actuator including a cylinder pivotally connected to the end of one of the shoes. The fluid cylinder defines a fluid chamber in which a piston is disposed. A piston rod projects from the cylinder and is connected to the end of the other of the shoes. A spring in the cylinder normally biases the piston in one direction whereby the shoes are moved radially against the surface of the drum. A fluid port is formed in the cylinder wall and communicates with the fluid chamber with the port being adapted to be connected to a source of fluid pressure which acts on the piston in opposition to the bias of the spring. In accordance with the principles of this invention, a second fluid port is formed in the cylinder wall on the same side of the piston as the spring. This second fluid port is adapted to be connected to a second source of fluid pressure with a variable valve in the pressure line. The pressure supplied to the first port on the release side of the piston is maintained constant at a level sufficient to compress the spring.

This arrangement is particularly advantageous in that, by varying the fluid pressure supplied to the torque side of the piston, the brake may be engaged at the desired torque level. Moreover, simply by varying the valve while the brake is operating, compensation for lining wear may be affected. Yet, in the event of air failure, the spring becomes operative to engage the brake and provide emergency stopping of the machine.

Referring now to the drawings wherein like reference numerals indicate like parts in the various views, FIGURE 1 is an end elevation, partly in section, showing a brake constructed in accordance with this invention, FIGURE 2 is a side elevation view of the brake of FIGURE 1.

Referring now to FIGURE 1, there is illustrated a clam-type drum brake indicated generally by the reference numeral 10. This brake, with the exception of the actuator, is of conventional construction and includes first and second segmental arcuate brake shoes or straps 11 and 12. Each shoe 11, 12 has secured over a portion of its inner periphery, a brake lining 13, 14 attached by appropriate means such as rivets 15. The shoes 11 and 12 overlap at one end with pin means 20 pivotally interconnecting the two shoes. The pin means may comprise a stud 21 which is threaded into a fixed support 22 with a nut 23 and bushing 24 retaining the shoes on the stud.

A brake drum 30 is adapted to be received over a shaft which passes through a central opening 31 in the drum. The drum 30 is positioned between the shoes 11 and 12 and the outer periphery of the drum is adapted to be engaged by the friction linings 13, 14 to provide a braking action in a manner well known in the art. The other ends 32, 33 of the brake shoes 11 and 12 each have bifurcated arms 35, 36, respectively, with the two arms 35, 36 being spaced apart to provide a space in which the brake actuator may be received.

Referring now to the actuator, indicated generally by the reference numeral 40, the actuator comprises a cylinder housing 41 which is supported at one end by a pin 42 passing through the bifurcated arms 36 and the extension 43 of the housing received between the arms. The cylinder 41 is shown as being of a two-piece construction but it will be appreciated that this is for purposes of illustration only and that other types of constructions of cylinder housings as well as other means of attachment may be employed. The cylinder defines an interior fluid chamber in which there is received a piston 46. The piston 46 includes packing or seals 47 on its radially outer peripheral surface to form a seal between the piston and the inner walls of the cylinder 41, thereby dividing the fluid chamber into two portions 44 and 45. The chamber 45 may be considered as being on the release side of piston 46 with the chamber 44 on the torque side of piston 46.

A piston rod 50 is connected at one end 51 to the piston 46 with other end of the rod 50 projecting externally of the cylinder 41. A pin 53 rotatably secures the projecting end of the rod 50 to the bifurcated arms 35 of the brake shoe 11. A spring 55 in the chamber 44 encircles the piston rod 50 with one end of the spring abutting against the piston 46 and the other end against the end wall of the chamber. It will be appreciated that with this arrangement, the spring 55 biases the piston 46 to the left, as viewed in FIGURE 1, which tends to draw the two ends of the brake shoes toward each other resulting in frictional gripping of the drum 30 by the brake linings 13, 14.

A first fluid port 60 is formed in the wall of the cylinder 41 and provides communication between a source of fluid and the fluid chamber 45. Spaced from the port 60 on the opposite side of the piston 46 is a second fluid port 62. This latter fluid port is connected by a pressure line 63 to a source of fluid pressure with a variable control valve 64 interposed in the fluid line. It is contemplated that the source of fluid pressure connected to the port 60 will be different from the source of pressure for the port 62. More specifically, in accordance with this invention, it is contemplated that the fluid pressure in chamber 45 will be maintained substantially constant so that the pressure against the piston 46 on the release side is constant. The pressure level in chamber 45 should only be high enough to compress the spring 55 during normal operation so that the piston 46 is prevented from moving to the left under the bias of the spring 55.

The pressure supplied to chamber 44 is variable due to the presence of the control valve 64 and operates, in combination with the biasing action of the spring 55, to overcome the constant pressure applied through the port 60. During normal operation of the brake, it will be appreciated that due to the counterbalancing of the spring 55 and the fluid pressure on the opposite side of the piston, the pressure introduced through the port 62 constitutes the major applied force for obtaining the required torque of the brake. This pressure to engage the brake may be varied by operation of the control valve 64 as the brake is in operation. When it is desired to disengage the brake, the pressure in the port 62 is relieved thus permitting the fluid pressure on the other side of the piston to overcome the bias of the spring 55.

The above described brake operates in the following manner. Sufficient fluid pressure is introduced through the port 60 to the release side of the piston 46 to overcome the bias of the spring 55 and maintain the brake in the disengaged position. When it is desired to engage the brake, the control valve 64 is operated to introduce air pressure through the port 62 to chamber 44 on the torque side of the piston 46. The combination of the spring 55 and the air pressure in chamber 44 overcomes the pressure in chamber 45 and causes the piston to move to the left, as shown in FIGURE 1, thereby drawing the two ends of the brake shoes together to grip the drum 30 therebetween. When it is desired to disengage the brake, the fluid pressure applied to the piston in chamber 44 is relieved and the constant fluid pressure on the release side of the piston then overcomes the bias of the spring 55 to disengage the brake. In the event of air failure, the air pressure on both sides of the piston 46 will be relieved thus permitting the spring 55 to be effective to engage the brake.

There are several advantages to the above described arrangement. A brake employing an actuator constructed in accordance with this invention no longer requires a manual adjustment of the brake to compensate for the decreasing compressive force on the spring. Rather the spring is placed under compression when the brake assembly is initially installed and, thereafter, such wear as may occur in the lining is simply compensated for through the variable control of the air pressure. As a result, it is unnecessary to stop operation of the brake to effect the adjustment.

Another advantage of the invention is that a particular level of torque may be obtained without the necessity of the wrench adjustments heretofore required. Moreover, as lining wear occurs, the variable air pressure on the torque side of the piston provides a simple means of maintaining the brake at its predetermined torque level.

It will also be apparent that the use of variable air pressure on the torque side of the piston provides a simple inexpensive method of making the necessary adjustments in the brake. Thus, no additional expensive complex equipment need by employed since the air pressure normally available with many types of machine installations may be employed as the means for supplying pressure to the torque side of the piston.

An additional advantage of the described brake actuator is that a faster operating brake is obtained. This is of particular importance in machinery which operate at relatively high speeds such as a high speed press in which a quick reacting brake is desirable. A brake employing the improved actuator is faster operating since the spring is no longer the sole means for evacuating the fluid pressure from the chamber on the release side of the piston to effect brake engagement. Rather, it is the combination of the spring together with the fluid pressure on the torque side of the piston which engages the brake. The presence of the additional force supplied by the fluid pressure assures a faster engagement of the brake linings with the drum.

Another important feature of the brake actuator is its utility as an integral part of a safety system. Thus, the torque side of the cylinder may be connected to an additional source of high pressure air which may be controlled by a valve electronically actuated from a point of possible malfunction. In the event of malfunction, the high pressure air would be introduced to the cylinder and the brake would be very rapidly applied to bring the mechanism to a sudden stop.

Although the invention has been described in connection with a clam-type drum brake which is of the contracting type, it will be appreciated that the principles of the invention may also be applied to actuators for other types of brakes. For example, a brake of the expanding type could also employ an actuator such as that described herein.

Having thus described my invention, I claim:

1. In a brake having a rotatable member, first and second brake shoes disposed on opposite sides of said member, means supporting said shoes for movement toward and away from said member, an actuator connected to said shoes, said actuator including a cylinder, piston means in said cylinder including a piston and a piston rod connected to said piston for movement therewith, and spring means in said cylinder operatively connected to said piston means for biasing said piston means in one direction whereby said shoes are biased toward engagement with said member, the improvement comprising:

said piston means dividing said cylinder into first and second fluid chambers;

a first fluid port in said cylinder in communication with one fluid chamber and adapted to be connected to a source of fluid pressure whereby said fluid pressure may act on one face of said piston means to move said piston means in said one direction;

a second fluid port in said cylinder in communication with the other of said fluid chambers and adapted to be connected to another source of fluid pressure whereby said other source of fluid pressure may act on an opposed face of said piston means to oppose movement of said piston in said one direction; and valve means in the fluid line between said first fluid port and its associated source of fluid pressure whereby the pressure in said one fluid chamber may be varied.

2. The improvement defined in claim 1 wherein the fluid pressure in said other fluid chamber is substantially constant.

3. The improvement defined in claim 1 wherein the fluid pressure in said other fluid chamber is maintained at a level which is greater than the force exerted by said spring means.

4. The improvement defined in claim 3 wherein said fluid pressure in said other chamber is substantially constant.

5. The improvement of claim 4 wherein said means supporting said shoes includes means interconnecting one end of said shoes whereby said shoes are supported for pivotal movement toward and away from said rotatable member, said cylinder being pivotally connected to the other end of one of said shoes and said piston rod being connected to the other end of the other of said shoes.

References Cited

UNITED STATES PATENTS

| | | | |
|---|---|---|---|
| 2,809,723 | 10/1957 | Howze | 188—170 X |
| 2,822,064 | 2/1958 | Weiland | 188—170 X |
| 3,090,359 | 5/1963 | Hoppenstand | 188—170 X |
| 3,297,115 | 1/1967 | Waloen et al. | 188—170 |

DUANE A. REGER, Primary Examiner

U.S. Cl. X.R.

188—170